United States Patent [19]

Kawamoto et al.

[11] Patent Number: 4,954,736
[45] Date of Patent: Sep. 4, 1990

[54] PERMANENT MAGNET ROTOR WITH MAGNETS SECURED BY SYNTHETIC RESIN

[75] Inventors: Tetsuo Kawamoto; Ryo Motohashi; Toshihiro Sakamoto; Yasuo Suzuki; Hideaki Abe, all of Kadoma, Japan

[73] Assignee: Matsushita Electric Works, Ltd., Japan

[21] Appl. No.: 340,764

[22] Filed: Apr. 20, 1989

[30] Foreign Application Priority Data

Apr. 25, 1988 [JP] Japan ............................. 63-101788
Jun. 27, 1988 [JP] Japan ............................. 63-158461

[51] Int. Cl.$^5$ ..................... H02K 21/12; H02K 1/04; H02K 1/22
[52] U.S. Cl. ................................ 316/156; 310/43; 310/261
[58] Field of Search ............ 310/42, 43, 45, 156, 310/214, 215, 261; 29/598; 264/272.19, 272.2

[56] References Cited

U.S. PATENT DOCUMENTS 3,221,194  11/1965  Blackburn ...................... 310/156
4,393,320  7/1983  Anderson ....................... 310/156
4,434,546  3/1984  Hershberger ................... 310/156

FOREIGN PATENT DOCUMENTS 1359548   7/1974  Japan ............................. 310/156
57-34170  7/1980  Japan .
62-247745 10/1987  Japan .
262643   11/1987  Japan ............................. 310/261

Primary Examiner—Peter S. Wong
Assistant Examiner—C. LaBalle
Attorney, Agent, or Firm—Leydig, Voit & Mayer

[57] ABSTRACT

A permanent magnet rotor has a plurality of holding projections radially outward projected from a yoke secured to outer periphery of a rotor shaft, the projections being extended in axial direction of the shaft and yoke while expanded at tip end portions in circumferential directions, and a plurality of permanent magnet segments respectively disposed between adjacent ones of the holding projections to have gaps remained at least partly in the periphery of the segments, the gaps being filled with a thermosetting resin so that constant positioning of the segments with respect to the yoke can be attained with the resin filled.

9 Claims, 4 Drawing Sheets

PERMANENT MAGNET ROTOR WITH MAGNETS SECURED BY SYNTHETIC RESIN

BACKGROUND OF THE INVENTION

This invention relates to a permanent magnet rotor in which permanent magnet segments are peripherally mounted on a yoke which is coaxially secured to a rotor shaft.

Permanent magnet rotor of this kind are effectively employed in brushless motors in which the rotor is surrounded by a stator.

DISCLOSURE OF PRIOR ART

Generally, a permanent magnet rotor employed in a brushless motor comprises a cylindrical permanent magnet magnetized its outer periphery to be alternately of opposite polarity. In this case, an attempt to increase the magnetic force of the rotor has been subjected to restrictions in respect of the formation of magnetic field or of sintering step, and no satisfactory result has been attained. For this reason, the rotor employing the permanent magnet segments into which the cylindrical permanent magnet is divided for every magnetic poles has been increasingly generally utilized, since the magnetic field formation and sintering step can be thereby made easier and a desired rotor magnetic force can be obtained.

In recent years, there has been a demand for brushless motors have a reduced size which attaining a higher output, and which can operate in excess of 20,000 rpm, whereby it has become necessary that the miniaturized rotor structure be capable of high-revolutions and additionally it is important that the structure be resistant to higher heat generated due to the higher speeds.

U.S. Pat. No. 4,591,749 to R. H. Gauthier et al discloses a permanent magnet rotor in which a plastic frame having leg parts expanded in width at their tips is mounted on a rotor shaft together with a yoke, and the permanent magnet segments are held between adjacent leg parts. In this case, the permanent magnet segments can be secured to the rotor shaft without any bonding agent so that the segments can be prevented from peeling off and scattering due to fusion of the bonding agent even when, for example, the rotor is heated to a high temperature by high speed revolution. When the rotor speed exceeds 20,000 rpm however, the centrifugal force applied to each permanent magnet segment may each more than 50 kgf if the rotor has a diameter of 28 mm and each segment weighs 8 grams. Therefore even a segment-holding frame made of a thermosetting resin having a high mechanical strength may deteriorate in strength such that, when the rotor temperature reaches, about 150° C., for example the mechanical strength is decreased to about ⅓ of the strength at, normal temperatures, and the frame may not be able to endure high-speed revolution of the rotor.

Japanese Utility Model Application Laid-Open Publication No. 57-34170 of H. Hayashi et al. discloses been disclosed another permanent magnet rotor which is formed by mounting a yoke about the rotor shaft, disposing them within an injection mold together with permanent magnet segments disposed around the yoke as spaced therefrom in all radial directions and from one another in circumferential direction and as engaged at radially outer surfaces to inner periphery of the mold, and filling respective spaces between the yoke and the permanent magnet segments and between the respective permanent magnet segments with a plastic material. The permanent magnet segments are cut off at respective radially outer and axially extending edges so that the plastic material filled between the respective segments will be expanded in the width at such cut off edges of the segments, whereby the permanent magnet segments can be prevented from being scattered upon rotation of the rotor. Furthermore, no peeling off of the segments takes place since they are not held to the rotor by only the bonding agent. Further, the plastic filling carried out in the state where the respective permanent magnet segments are engaged to the inner periphery of the injection mold allows the segments to be always positioned in a constant relationship to the rotor shaft. Because a plastic material is used for preventing the permanent magnet segments from scattering, however, the same problem as in the foregoing U.S. patent arises and this rotor has not been adequately durable during high-speed revolution.

Japanese Patent Application Laid-Open Publication No. 62-247745 of K. Izaki et al, discloses a permanent magnet rotor which comprises a yoke having four integral, radially outward holding projections and mounted on a rotor shaft, the projections extending in axial direction of the shaft and yoke and expanded at tip end portions in circumferential directions, and permanent magnet segments respectively held between adjacent ones of the holding projections. In this known rotor, however, the permanent magnet segments are held by the projections as bonded to the yoke with a bonding agent, whereby there have arisen such problems that manufacturing steps are complicated particularly due to required bonding step, and that, as the bonding agent is caused to melt under a high temperature condition, a backlash of the permanent magnet segments is caused to occur between the holding projections due to dimensional fluctuation accompanying the manufacturing tolerance between positions of the holding projection, so that the segments may be subjected to an impact load due to the backlash or to a load concentration apt to occur during the high speed revolution to contacting zones between the segments and the holding projections, the zones becoming to be of point contact when the segments or projections have uneven surface, so as to render the segments eventually damaged.

SUMMARY OF THE INVENTION

A primary object of the present invention is, therefore, to provide a permanent magnet rotor which can be sufficiently durable under high speed revolution with the permanent magnet segments mounted without any looseness to the yoke at a sufficiently high holding force and positioned constantly appropriately even when constituents involve certain dimensional fluctuation due to manufacturing tolerance, and still can be easily manufactured.

According to the present invention, this object can be attained by a provision of a permanent magnet rotor in which a yoke secured to outer periphery of a rotor shaft is provided with a plurality of radially outward holding projections extending in axial direction of the shaft and expanded in width in circumferential directions at radial tip ends, and permanent magnet segments are fixedly held respectively between adjacent ones of the holding projections, characterized in that the permanent magnet segments are disposed to have gaps remained at least partly in the periphery of the segments, and a thermosetting resin is filled in the gaps to have the permanent magnet segments positioned at constant relationship to the rotor shaft and yoke.

Other objects and advantages of the present invention shall be made clear in following description of the invention detailed with reference to embodiments shown in accompanying drawings.

Figure 4:
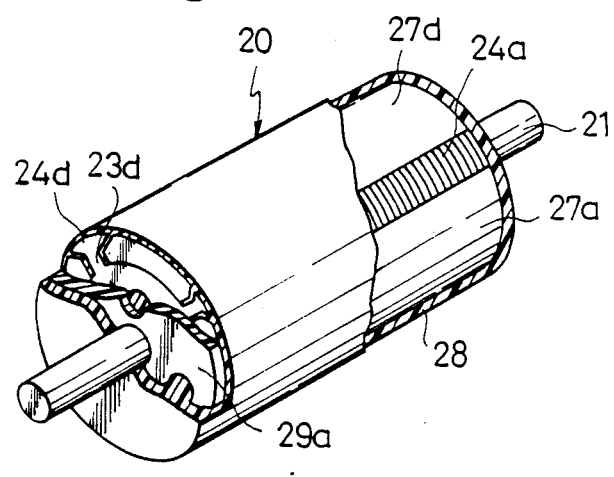
FIG. 4 is a perspective view of the permanent magnet rotor in another embodiment according to the present invention with parts thereof shown as cut off.

FIG. .6 is a perspective view as disassembled of the rotor of FIG. 4; and

FIG. 7 is a perspective view of still another embodiment of the present invention.

While the present invention shall now be explained with reference to the embodiments shown in the accompanying drawings, it should be appreciated that the intention is not to limit the invention only to these embodiments but to rather include all modifications, alterations and equivalent arrangement possible within the scope of appended claims.

DISCLOSURE OF PREFERRED EMBODIMENTS

Figure 1:
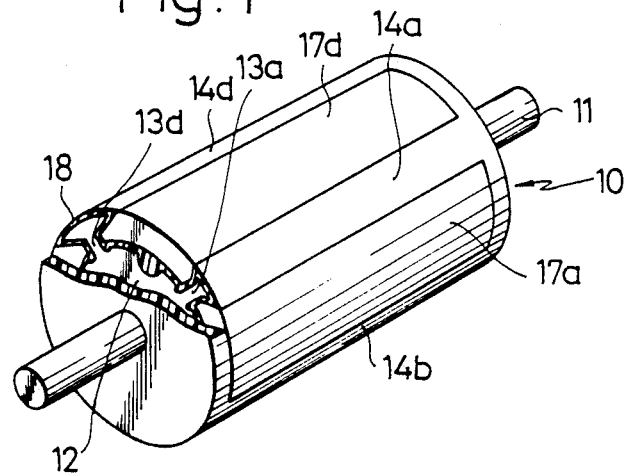
FIG. 1 is a perspective view of a permanent magnet rotor in an embodiment according to the present invention with a part shown as cut off.
Figure 2:
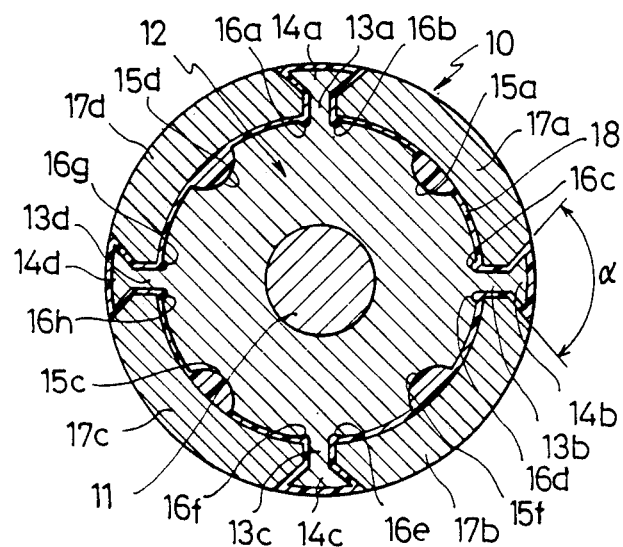
FIG. 2 is a cross sectional view of the rotor of FIG. 1.
Figure 3:
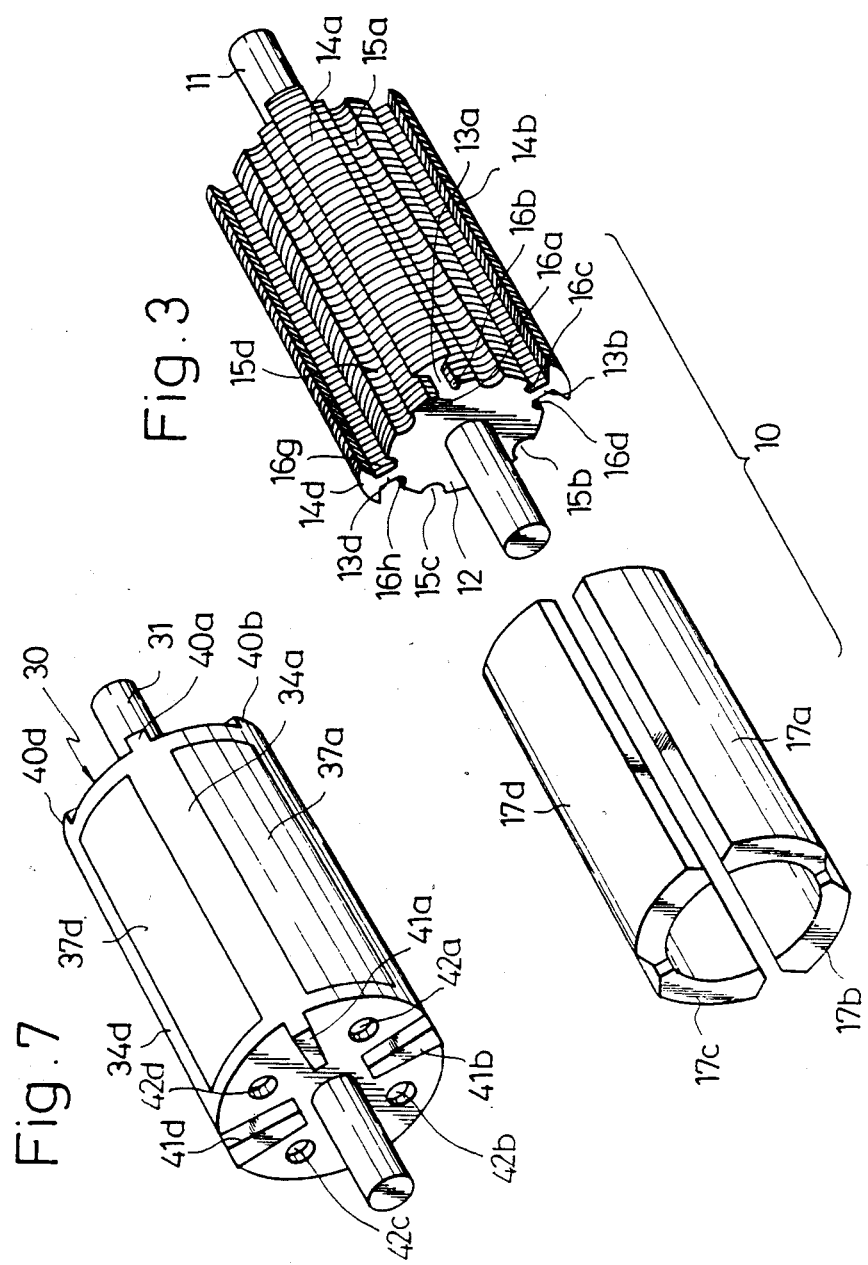
FIG. 3 is a perspective view as disassembled of the rotor of FIG. 1.

Referring to FIGS. 1 through 3, there is shown an embodiment of the permanent magnet rotor according to the present invention. This permanent magnet rotor 10 includes a rotor shaft 11 and a yoke 12 secured to outer periphery of the rotor shaft 11. Preferably, the yoke 12 is formed by stacking many yoke element leaves obtained preferably by punching such magnetic material as a silicon steel plate and shaping them. The thus formed yoke 12 is provided with a plurality (four in the present embodiment shown here) of holding projections 13a through 13d projecting radially outward and extending in axial direction of the shaft and yoke, at circumferentially regular intervals and to be substantially of the same height. Further, the holding projections 13a-13d are formed to be expanded in their width at radially projected tip ends. Practically, it is preferably that the projections 13a-13d are formed to have expanded portions 14l-14d respectively expanding from about ½ position of the entire height of each of the projections 13a-13d at an angle of $\alpha$($\alpha$=120° to 160°) in both circumferential directions. Between adjacent ones of the respective projections 13a,13b; 13b,13c; 13c,13d; 13d,13a and substantially in the center, radially inward semicylindrical recesses 15a-15d of a radius of, for example, about 1-2 mm and extending int the axial direction of the shaft and yoke are provided, and further small radially inward recesses 16a-16h about 0.5 mm deep and extending in the axial direction are provided on both sides of respective base portions of the holding projections 13a-13d.

Between the respective holding projections 13a,13b; 13b,13c; 13c,13d; 13d,13a, on the other hand, there are defined spaces for accommodating therein permanent magnet segments 17a-17d respectively elongated in the axial direction of the yoke and shaft and having an arcuate section. In the present instance, the permanent magnet segments 17a-17d are formed respectively to define air gaps of, for example, about 0.2 mm between opposing surfaces of the segments and yoke, specifically between radially inner peripheral and circumferentially both end surfaces of the segments and radially outer peripheral surface and both side surfaces at the holding projections 13a-13d of the yoke 12, when the segments 17a-17d are accommodated in the corresponding spaces. The permanent magnet segments 17a-17d are respectively formed to be cut off at both side edges opposing the expanded portions 14a-14d of the holding projections 13a-13d so that they will oppose to each other through optimum gaps.

The permanent magnet rotor 10 may be accommodatable in a generally utilized injection mold (not shown) in such that, when the rotor 10 is placed in such mold, the radially outer peripheral surfaces of the permanent magnet segments 17a-17d will engage inner peripheral surface of the mold whereas outer edgewise surfaces of the holding projections 13a-13d will oppose the inner peripheral surface of the mold with a gap left between them. When a gate of the injection mold is positioned in alignment with the semicylindrical recesses 15a-15d of the yoke 12 and such thermosetting resin as an unsaturated polyester resin is injected, the resin enters mainly through the recesses 15a-15d into the respective gaps between the inner peripheral surface of the mold and the outer edgewise surfaces of the holding projections 13a-13d and between the radially outer peripheral surfaces of the yoke 12 as well as the both side surfaces of the projections 13a-13d and the inner peripheral and circumferential both end surfaces of the permanent magnet segments 17a-17d, and a molded resin layer 18 is formed continuously in the gaps.

As will be clear from the foregoings, the outer diameter of the permanent magnet rotor 10 in the present instance is determined by inner diameter of the injection mold, which diameter is set to be, for example, 28 mm. In forming the molded resin layer 18, practically, the thermosetting resin is made into a molten state at 120°-130° C. and is injected through the gate into the mold, then the respectively permanent magnet segments 17a-17d are urged radially outward by a pressure of the molten resin flowing through the recesses 15a-15d so as to intimately abut against the inner periphery of the mold. The molten resin injected is caused to flow also through the small recesses 16a-16d in addition to the semicylindrical recesses 15a-15d smoothly into the entire gaps to fill and set therein and the molded resin layer 18 is formed. Since the permanent magnet segments 17a-17d are brought into intimate engagement with the inner periphery of the mold by the pressure of the molten resin injected initially into the recesses 15a-15d and flowing thereout to the gaps, the respective permanent magnet segments 17a-17d can eventually be positioned at equal distance from the rotor shaft 11 and yoke 12. Because the molten resin can flow through the small recesses 16a-16d substantially uniformly into the gaps on the circumferentially both side surfaces of the respective holding projections 13a-13d, the respective permanent magnet segments 17a-17d can be constantly positioned without one-sided deviation in the spaces between the adjacent ones of the holding projections 13a,13b; 13b,13c; 13c,13d and 13d,13a. That is, when the permanent magnet segments are four of 17a-17d as in the present embodiment, they can be held in position accurately with their center axis disposed at every 90 degrees position in rotary angle. Further, the molded resin layer 18 should preferably be of a thickness of, for example, at least 0.2 mm in an event where the rotor 10 has an outer diameter of 28 mm.

In the foregoing arrangement, by the way, the permanent magnet segments 17a-17d are respectively magnetized by any known magnetizer to have opposing poles in the radial thickness direction and are mutually disposed to be alternately opposite polarity in the circumferential directions.

According to the permanent magnet rotor 10 of the present embodiment, the permanent magnet segments 17a-17d can be reliably prevented from scattering by the expanded portions 14a-14d having circumferentially both side expansions at the radial tip ends of the holding projections 13a-13d and, in addition, the permanent magnet segments 17a-17d can be set in position under the pressure of the molten resin, the positioning of the respective permanent magnet segments can be stabilized. Accordingly, it has been found that the manufacture of the rotor can be made easier, while the rotor can be sufficiently minimized in size and improved remarkably in the durability with respect to the high speed revolution so as to be sufficiently durable against the centrifugal force upon rotation of more than 20,000 rpm. Further, as the air gaps between the holding projections 13a-13d and the permanent magnet segments 17a-17d are closely filled with the thermosetting resin, there takes place no such problem that the permanent magnet segments or the holding projections are damaged by the impact load or load concentration due to any backlash of the segments.

Figure 5:
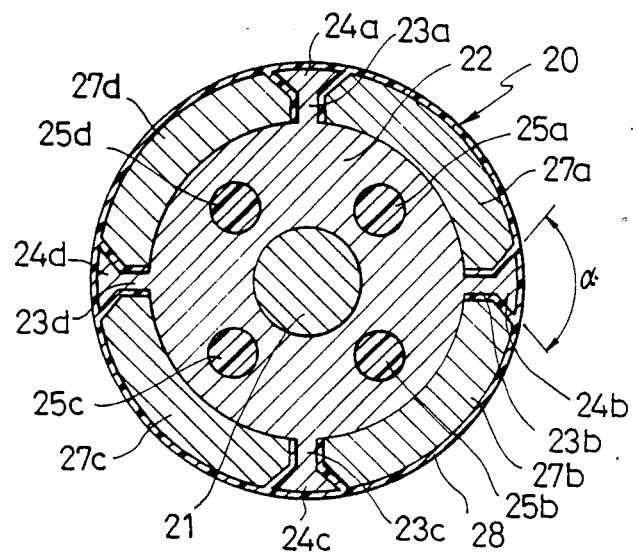
FIG. 5 is a cross sectional view of the rotor of FIG. 4.
Figure 6:
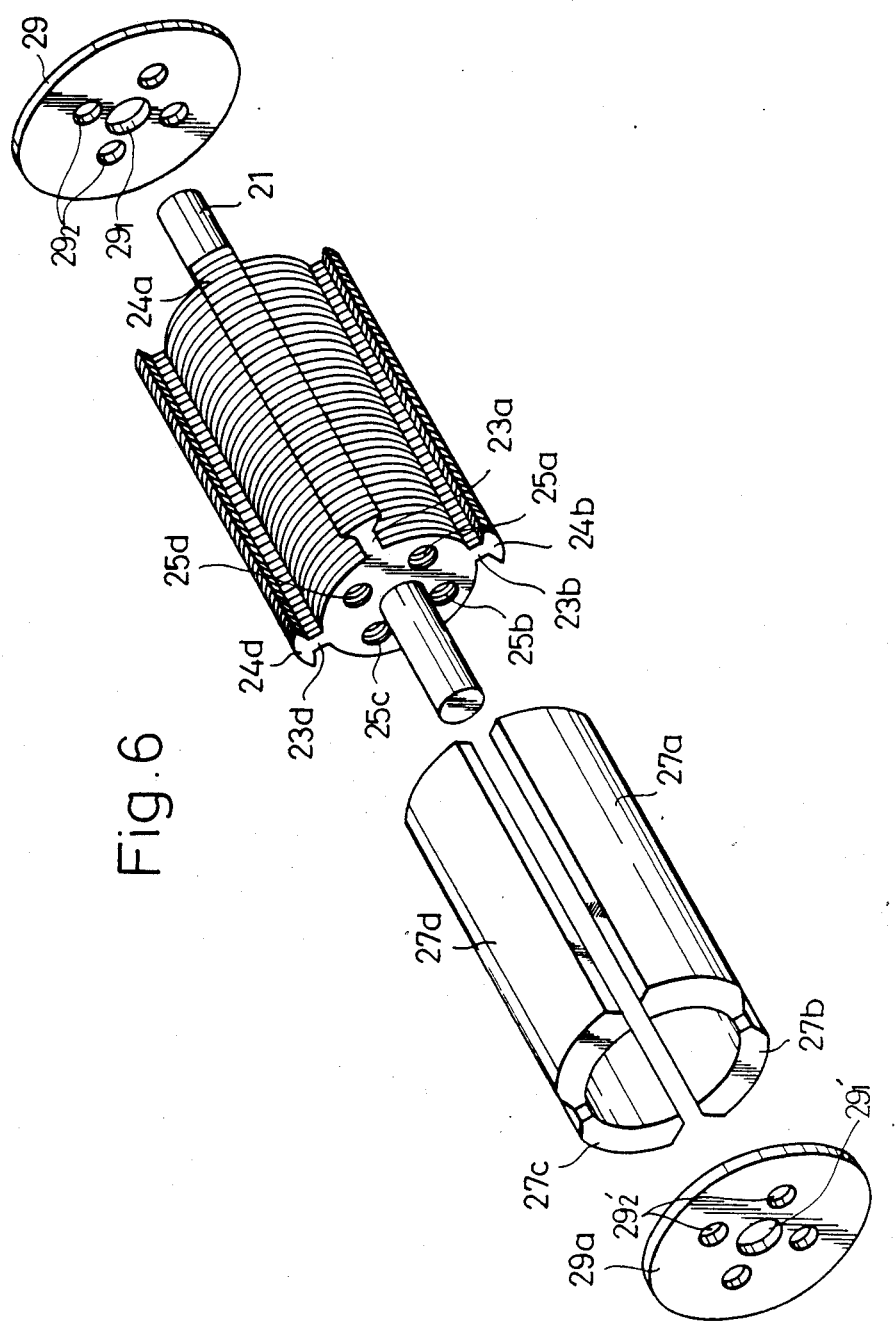

Referring next to FIGS. 4 to 6, there is shown another embodiment of the permanent magnet rotor according to the present invention, in which the same constituents as in the foregoing embodiment of FIGS. 1-3 are denoted by the same reference numerals as those used in FIGS. 1 and 3 but with a FIG. 10 added. In the present instance, in contrast to the foregoing embodiment of FIGS. 1-3, the arrangement is so made as to dispose a synthetic resin layer 28 to cover over outer surfaces of the permanent magnet segments 27a-27d instead of the radially inner surfaces of the segments. In this case, the semicylindrical and small recesses 15a-15d and 16a-16d are omitted, and a yoke 22 is formed to have a plurality of through holes 25a-25d extending in parallel to the longitudinal axis. On both axial end surfaces of the yoke 22, there are disposed two disks 29 and 29a of a slightly smaller diameter than that of a circle including radially outer end surfaces of holding projections 23a-23d. Preferably, these disks 29 and 29a are formed by, for example, a nylon resin containing glass fibers to be about 2 mm thick, and are provided in axial center with axial holes $29_1$ and $29_1'$ and with through holes $29_2$ and $29_2'$ aligning with the through holes 25a-25d.

In the present instance, the above members forming the permanent magnet rotor 20 are accommodated in a molding tool (now shown) of an inner diameter slightly larger than a diameter of a circle including the outer end surfaces of the holding projections, and a molten resin is injected through a gate into the tool. Then the injected molten resin is made to flow beyond outer peripheral edge of the disk 29 or 29a into gaps between the entire inner periphery of the tool and the radially outer surfaces of the holding projections 23a-23d and of the permanent magnet segments 27a-27d, as well as between circumferentially both side surfaces of the holding projections 23a-23d and also circumferentially both end surfaces of the permanent magnet segments 27a-27d. Further, the molten resin injected is also made to flow through the through holes $29_2$ or $29_2'$ of the disk 29 or 29a and the through holes 25a-25d over to axially the other end side of the yoke 22 and beyond the outer peripheral edge of the disk 29a or 29. In this event, the permanent magnet segments 27a-27d are urged radially inward by the pressure of the molten resin flowing over the outer peripheral edge of the disk 29 or 29a so as to be intimately engaged to the outer periphery of the yoke 22. At the same time, the molten resin flows substantially uniformly along circumferentially both side surfaces of the holding projections 23a-23d, whereby the permanent magnet segments 27a-27d can be positioned constantly at desired positions without any circumferential one-sided deviation. It should be appreciated that, in the present embodiment, the permanent magnet segments 27a-27d are also covered by the resin layer over the radially outer periphery and thus the segments can be well protected.

In the embodiment of FIGS. 4–6, other arrangements and operation are substantially the same as those in the foregoing embodiment of FIGS. 1-3.

In either one of the embodiments of FIGS. 1-3 and FIGS. 4–6, it is preferable that the synthetic resin layer 18 or 28 is provided to cover both axial end surfaces of the rotor 10 or 20. Further, as shown in FIG. 7, the axial end surfaces of the synthetic resin layer 18 or 28 of the rotor 10 or 20 may be provided with a plurality of heat radiation fins 40a-40d and 41a-41d which are extended in the axial directions, and with a plurality of recesses 42a-42d for being filled with a putty or the like to achieve balance regulation. In FIG. 7, constituents equal to those in the embodiment of FIGS. 1-3 are denoted by the same reference numerals as those used in FIGS. 1-3 but with a FIG. 20 added. The heat radiation fins as well as the balance regulating recesses may be employed if required also in the embodiment of FIGS. 4–6. Further, the disks in the embodiment of FIGS. 4–6 may be formed by aluminum, stainless steel or the like, other than the synthetic resin material.

What is claimed is:

1. A permanent magnet rotor comprising:
    a rotor shaft;
    a yoke which is coaxially secured to said rotor shaft, said yoke having a central portion and a plurality of magnet-holding projections which project radially outward from the central portion of said yoke and extend in the axial direction of said yoke, each magnet-holding projection having a radially inner end which is secured to the central portion of said yoke and a radially outer end which has a greater width than the radially inner end;
    a plurality of permanent magnet segments which extend in the circumferential direction of said yoke between adjacent magnet-holding projections, each of said magnet segments having end portions cooperating with the radially outer ends of said magnet-holding projections in the circumferential direction of said yoke to prevent the segment from moving radially outward, each segment being separated from said yoke by a gap along at least a portion of its periphery, the end portions being separated from said magnet-holding projections by gaps;

thermosetting synthetic resin filling the gaps between said magnet segments and said yoke and between the end portions of said segments and said magnet-holding projection and maintains the positions of said permanent magnet segments constant with respect to said yoke; and said yoke having a recess which is formed on the outer periphery of the central portion of said yoke in the gap between the central portion and said permanent magnet segments, which extends in the axial direction of said yoke, and which is filled with said synthetic resin.

2. A rotor according to claim 1 wherein said yoke has another recess which is formed on the outer periphery of the central portion of said yoke in the gap between the central portion and the permanent magnet segments adjacent to the radially inner end of each of said magnet-holding projections and which is filled with said synthetic resin.

3. A permanent magnet rotor comprising:
a rotor shaft;
a yoke which is coaxially secured to said rotor shaft, said yoke having a central portion and a plurality of magnet-holding projections which project radially outward from the central portion of said yoke and extend in the axial direction of said yoke, each magnet-holding projection having a radially inner end which is secured to the central portion of said yoke and a radially outer end which has a greater width than the radially inner end;
a plurality of permanent magnet segments which extend in the circumferential direction of said yoke between adjacent magnet-holding projections, each of said magnet segments having end portions cooperating with the radially outer ends of said magnet-holding projections in the circumferential direction of said yoke to prevent the segment from moving radially outward, each segment being separated from said yoke by a gap along at least a portion of its periphery, the end portions being separated from said magnet-holding projections by gaps;
thermosetting synthetic resin which fills the gaps between said magnet segments and said yoke and between the end portions of said segments and said magnet-holding projections and maintains the positions of said permanent magnet segments constant with respect to said yoke; and
each radially outer end of each of said magnet-holding projections overlapping the end portions of a pair of said permanent magnet segments and being separated therefrom by gaps which are filled by said synthetic resin.

4. A rotor according to claim 3, further comprising through holes which extend axially through the central portion of said yoke and disks abutting axial end surfaces of said yoke, said disks having through holes aligned with said through holes in said yoke.

5. A rotor according to claim 3 wherein said synthetic resin provides a layer which covers the entire outer periphery of said permanent magnet segments and the magnet-holding projections.

6. A permanent magnet rotor comprising:
a rotor shaft;
a yoke which is coaxially secured to said rotor shaft, said yoke having a central portion and a plurality of magnet-holding projections which project radially outward from the central portion of said yoke and extend in the axial direction of said yoke, each magnet-holding projection having a radially inner end which is secured to the central portion of said yoke and a radially outer end which has a greater width than the radially inner end;
a plurality of permanent magnet segments which extend in the circumferential direction of said yoke between adjacent magnet-holding projections, each of said magnet segments having end portions cooperating with the radially outer ends of said magnet-holding projections in the circumferential direction of said yoke to prevent the segment from moving radially outward, each segment being separated from said yoke by a gap along at least a portion of its periphery, the end portions being separated from said magnet-holding projections by gaps;
thermosetting synthetic resin which fills the gaps between said magnet segments and said yoke and between the end portions of said segments and said magnet-holding projections and maintains the positions of said permanent magnet segments constant with respect to said yoke; and
said rotor having axial ends which are covered by said synthetic resin.

7. A rotor according to claim 6, further comprising fins which project axially from the axial ends of said rotor.

8. A rotor according to claim 7 wherein said fins are constituted by said synthetic resin.

9. A rotor according to claim 6 further comprising recesses for rotor balance regulation which are formed in said synthetic resin at the axial ends of the rotor.

* * * * *

UNITED STATES PATENT AND TRADEMARK OFFICE
CERTIFICATE OF CORRECTION

PATENT NO. : 4,954,736

DATED : September 4, 1990

INVENTOR(S) : Kawamoto et al.

It is certified that error appears in the above-identified patent and that said Letters Patent is hereby corrected as shown below:

ON TITLE PAGE:

In item [56] Foreign Patent Documents change "1359548 7/1974 Japan...............310/156 to --1359548 7/1974 U.K................310/156--.

Signed and Sealed this

Thirty-first Day of December, 1991

Attest:

HARRY F. MANBECK, JR.

*Attesting Officer*  *Commissioner of Patents and Trademarks*